Figure 1:
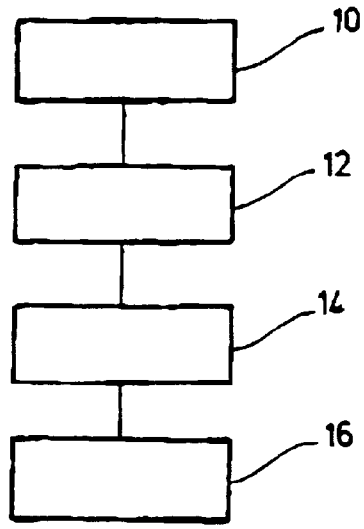

United States Patent

Berger

[11] Patent Number: 5,904,817
[45] Date of Patent: May 18, 1999

[54] PROCESS FOR THE CHEMICAL MODIFICATION OF THERMOPLASTICS THAT CONTAIN ALKYL GROUPS

[75] Inventor: Steffen Berger, Düsseldorf, Germany

[73] Assignee: Arplas Gesellschaft Für Plasmatechnologie mbH, Weissandt-Golzau, Germany

[21] Appl. No.: 08/849,353

[22] PCT Filed: Dec. 7, 1995

[86] PCT No.: PCT/EP95/04798

§ 371 Date: Jul. 22, 1997

§ 102(e) Date: Jul. 22, 1997

[87] PCT Pub. No.: WO96/17882

PCT Pub. Date: Jun. 13, 1996

[30] Foreign Application Priority Data

Dec. 8, 1994 [DE] Germany ............................ 44 45 048

[51] Int. Cl.⁶ ...................................................... H05F 3/00
[52] U.S. Cl. ...................... 204/157.15; 204/164; 204/165
[58] Field of Search ..................................... 204/164–169, 204/157.15

[56] References Cited

U.S. PATENT DOCUMENTS

| | | | |
|---|---|---|---|
| 4,626,473 | 12/1986 | Loh et al. | 428/409 |
| 5,234,723 | 8/1993 | Babacz | 427/491 |
| 5,283,086 | 2/1994 | Kodama et al. | 427/576 |
| 5,549,795 | 8/1996 | Gregoire et al. | 204/164 |

FOREIGN PATENT DOCUMENTS

| | | |
|---|---|---|
| 41 41805 A1 | 6/1993 | Germany . |
| 4309532 | 11/1992 | Japan . |
| 5323666 | 12/1993 | Japan . |
| WO 86/02023 | 4/1986 | WIPO . |
| WO 94/03263 | 2/1994 | WIPO . |
| WO 95/03344 | 2/1995 | WIPO . |
| WO 95/07946 | 3/1995 | WIPO . |

*Primary Examiner*—Kishor Mayekar
*Attorney, Agent, or Firm*—Finnegan, Henderson, Farabow, Garrett & Dunner, L.L.P.

[57] ABSTRACT

The invention relates to a process for the chemical modification of thermoplastics that contain alkyl groups. It is proposed to granulate the thermoplastics that contain alkyl groups and to subject them to a plasma treatment in a frequency range of from 10 kHz to 10 GHz.

10 Claims, 1 Drawing Sheet

PROCESS FOR THE CHEMICAL MODIFICATION OF THERMOPLASTICS THAT CONTAIN ALKYL GROUPS

This application is a 37 U.S.C. 371 National Stage Filing or PCT/EP95/04798, filed on Dec. 7, 1995.

The invention relates to a process for the chemical modification of thermoplastics that contain alkyl groups and to chemically modified thermoplastics that contain alkyl groups.

It is known that thermoplastics that contain alkyl groups, for example polyolefins and copolymers of polyolefins, can be used in many fields. If shaped parts or sheets are produced from the thermoplastics that contain alkyl groups, and if the intention is for them subsequently, for example, to be painted, coated, printed on or adhesively bonded, then it is necessary to pretreat the shaped parts and sheets. This pretreatment consists, for example, in a flame treatment, a corona treatment or a plasma treatment. This being the case, further to the poor selectivity and variability of known treatment processes, other disadvantages are that provision of the treatment devices requires increased technical outlay, and differing geometry of the shaped parts and sheets makes it necessary to have treatment devices of relatively large volume.

"Kunststoff-Taschenbuch", 25th edition, pages 248 to 259 discloses a process for the after-treatment of solids that contain alkyl groups. In this case, the surface of the solid that contains alkyl groups, for example a PE surface, is treated using a high-voltage plasma, in order to achieve local chemical modification. The effect achieved as a result of this local surface treatment, for example in the case of shaped parts, is an improvement in the paintability or printability. However, a disadvantage in this case is that an additional after-treatment must take place, application of which is possible only under certain circumstances, owing to the need to provide a high-voltage plasma system for the finished product.

The object of the invention is therefore to provide a process of the generic type, with which chemical modification of thermoplastics that contain alkyl groups can be carried out in simple and cost-effective fashion.

According to the invention, this object is achieved in that the thermoplastics that contain alkyl groups are granulated and subjected to a plasma treatment in a frequency range of from 10 kHz to 10 GHz. It has surprisingly been found that, by converting the thermoplastics that contain alkyl groups into a granulate form, and by plasma-treating them, a deliberate alteration of material properties can be brought about within the thermoplastics that contain alkyl groups. High-quality and high-quantity chemical modification can be achieved as a result of the conversion into granulate form. In particular, the plasma treatment of the granulated thermoplastics can be used to obtain chemical specialty products which can be used in a wide variety of ways, without a further expensive after-treatment being needed. In particular, shaped articles and sheets produced from the treated thermoplastics can, without additional prior after-treatment, for example be painted, coated, printed on, adhesively bonded, etc. A simple and preferable way of grading the chemical modification of the thermoplastics that contain alkyl groups is to set a particle size for the granulate and/or parameters in the plasma treatment.

In an advantageous configuration of the invention, provision is made for the plasma treatment to be carried out with varying frequencies, preferably with combinations of varying frequencies of different value. It is thus possible, very advantageously, to carry out the plasma treatment with frequencies which can be switched on sequentially, with frequencies of different value which can be switched on alternately, with at least two frequencies of different value which can be switched on simultaneously, and frequency-switching combinations resulting from these. By means of this, the chemical modification can very advantageously be tailored to the different chemical structure of the thermoplastics that contain alkyl groups which are used, and their intended use after the chemical modification.

In a further advantageous configuration of the invention, provision is made for the plasma treatment to be carried out while supplying at least one inert gas, for example helium and/or argon, and/or while supplying at least one reaction gas, for example oxygen and/or nitrogen and/or monomers. It is also preferable if the plasma treatment is carried out sequentially with an inert gas plasma and at least one reaction gas plasma and or a reaction gas plasma mixture or while supplying a mixture of at least one inert gas and a reaction gas. By selecting for the process gas during the plasma treatment a composition (inert gas, reaction gas, reaction gas mixture) which is tailored to the thermoplastics that contain alkyl groups and are to be modified, it is possible to incorporate into the granulated thermoplastics a sufficient quantity of the reactive groups, for example hydroxyl groups, carboxyl groups, primary and secondary amino groups, which are needed for the chemical modification. These incorporated groups are capable of reacting with the thermoplastic that contains alkyl groups and forming chemical bonds and/or physically adhering to it. Further polar, but unreactive groups that can be incorporated, for example carbonyl groups or tertiary amino groups, can likewise bring about a change in the properties of the thermoplastics that contain alkyl groups. Converting the thermoplastics that contain alkyl groups into the granulate form allows a relatively homogeneous modification of the thermoplastics that contain alkyl groups with the reactive or unreactive groups that are incorporated during the plasma treatment.

The thermoplastics which are treated therefore have a relatively homogeneous distribution of the incorporated reactive or unreactive groups over the entire spatial extent (granulate pile) of the thermoplastics that contain alkyl groups. It is thus possible to obtain any type of thermoplastics that contain alkyl groups, which after the plasma treatment are suitable for particular applications, a further subsequent treatment no longer being needed. A simple way of adjusting the thermoplastics that contain alkyl groups to their special application is to carry out the plasma treatment, in accordance with the invention, of a granulate of the thermoplastics that contain alkyl groups.

Overall, use has been made of the surprising effect of the invention that polymer-specific characteristics, such as molecular weight and molecular weight distribution, and a copolymer composition, have no significant influence on the degree of the effect obtained by means of the plasma treatment, but instead the alkyl-group content in the starting material is, primarily, decisive in this regard. By selecting a composition for the process gases which is tailored to the chemical structure of the starting material, and a sequence of frequency combinations which, in particular, is tailored to this, it is possible to incorporate various functional groups in alignment with the type of subsequent processing to be carried out on the shaped part or on the sheet, for example the painting, coating, printing on or adhesive bonding.

Figure 2:
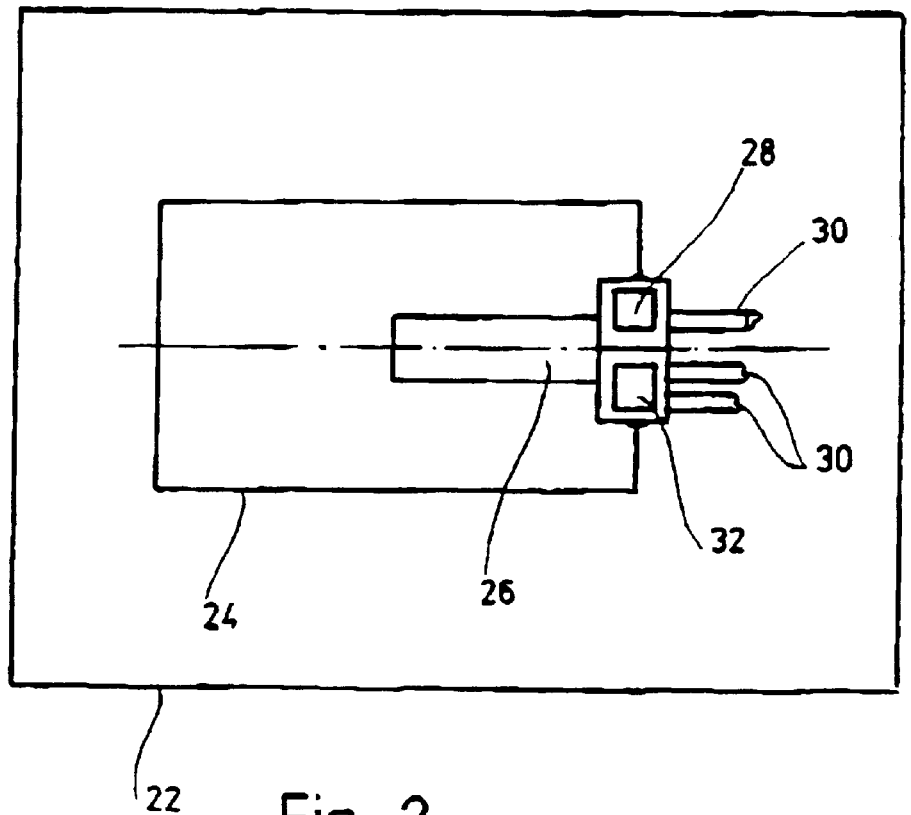

The invention will be explained in more detail below with reference to an illustrative embodiment and with the aid of the accompanying drawings, in which: FIG. 1 shows, in a flow chart, a process sequence for treating thermoplastics that contain alkyl groups, and FIG. 2 shows a schematic representation of an arrangement for carrying out the process.

FIG. 1 is intended to illustrate the process according to the invention with the aid of a chart. A first step 10 involves preparation of the thermoplastics that contain alkyl groups which are available as starting materials. The thermoplastics are here made into a granulate form, in which the particle size is, for example, less than 3 mm, additives which may be necessary, for example stabilizers, being added. Both new thermoplastics and thermoplastics obtained from recycling material can be used as starting materials. In the case of thermoplastics from recycling material, care should be taken that they are not excessively damaged, that is to say that there is still a suitable molecular structure. In a next step 12, the prepared starting material is introduced into a process chamber. The process chamber may in this case, for example, be a rotary drum of a plasma furnace, known per se, for carrying out a plasma treatment.

In a next step 14, the process parameters and process gases desired for treating the starting material are set. In particular, this involves establishing the special combinations of the process gases, that is to say a first treatment with an inert gas plasma, preferably with helium and/or argon, and the subsequent treatment with a reaction gas plasma, preferably with oxygen and/or nitrogen and/or monomers, or alternatively the treatment with a plasma which is produced from a mixture of the abovementioned gases. In addition, the radiofrequencies needed for plasma generation in a vacuum, and their timing, are set. Thus, variants may be envisaged, in which a plasma treatment is carried out firstly with a low frequency, for example 13.56 MHz, and subsequently with a higher frequency, for example 2.45 GHz. Switching the frequencies on alternately may also be envisaged. Of course, other frequencies may also be set in arbitrary, freely selectable sequence in order to carry out plasma treatment. It is also possible to provide alternating, and if appropriate even simultaneous, switching on of frequencies of different value. Further to this, the desired rotational speed of the rotary drum, for example in the region of between 4 and 20 revolutions per minute, and the desired process pressure which, for example, is in the range of between 0.1 mbar and 2 mbar, are set. During the plasma treatment, the process pressure may be subject to fluctuations associated with the process. The treatment duration, for which the treatment of the starting material takes place, is also established. It is, for example, between 5 and 900 s. The abovementioned process parameters, or process gases, can be varied relative to one another in arbitrary combination and are, in particular, tailored to the composition of the starting material which is physically present in each case.

In a next step 16, the plasma treatment of the starting material with the process parameters, or process conditions, set in step 14 then takes place. In this case, it is likewise conceivable for the process parameters to be varied and/or adjusted, for example using a control system, during the plasma treatment in step 16. By virtue of the described combination of the process gases and the process parameters of the plasma treatment, it is possible to incorporate a sufficient amount of reactive groups into the thermoplastics, as a function of the starting material used, this incorporation being needed for the purpose of a subsequent treatment of the thermoplastics that contain alkyl groups.

The thermoplastics that have been treated using the process according to the invention may then be processed using suitable devices, for example extruders, drawing devices, etc. to form shaped articles or sheets.

The process according to the invention is not restricted to the treatment of a specific thermoplastic that contains alkyl groups. Thus, it is possible to subject mixtures of various thermoplastics that contain alkyl groups, in a selectable combination, to the plasma treatment. This can be done in simple fashion by mixing the various thermoplastics that contain alkyl groups, which are present in granulate form, in particular quantities that can be selected respectively. It is also possible to carry out compounding or blending of the thermoplastics before and/or after the plasma treatment.

FIG. 2 schematically shows the structure of a device that can be used for the process. A plasma system, denoted overall by 22, has a rotary drum 24. The rotary drum 24 is used as a process chamber and may, for example, consist of a strong material such as aluminum or stainless steel. The process chamber can be sealed hermetically in order to generate a vacuum, there being no need to enter into further details regarding this. The rotary drum 24 is assigned a device 26 that serves as a reactor and is coupled to a generator 28 for microwave plasma excitation and a radiofrequency feed 32. Feed lines 30 for supplying process gases are also provided.

The arrangement represented here is merely an example, and the invention does not relate in detail to the physical structure of the system. The process according to the invention can, of course, also be carried out with a similar device that implements the individual process steps.

The process according to the invention then proceeds as follows. The thermoplastic that contains alkyl groups (if appropriate a mixture of different thermoplastics) which has been selected and prepared, is introduced into the rotary drum 24 and mixed therein thoroughly, in accordance with the selected speed of rotation and direction of rotation, which may also be chosen to alternate. The selected process gas, or process gas mixture, is supplied via the feed lines 30, and a plasma is generated in the reactor 26 by means of the generator 28. The plasma may in this case advantageously be generated by inputting microwave radiation at powers of between 200 and 1500 W (2.45 GHz). This being the case, the process gas or process gas mixture preferably has a process pressure of between 0.1 and 2 mbar. By means of the radiofrequency feed 32, a frequency of, for example, 13.56 MHz is applied and a plasma is generated. From the plasma that has been generated, activated particles impact on the starting material with which the rotary drum 24 is filled. This causes a structural change inside the starting material, that is to say the thermoplastic with which the drum is filled, consisting in the incorporation of polar groups (that contain oxygen and/or nitrogen). These polar groups include reactive groups (hydroxyl groups, carboxyl groups, primary and secondary amino groups) as well as unreactive groups (carbonyl groups, tertiary amino groups). Cross-linking does not take place. By corresponding alternating supply of different process gases via the feed lines 30, and different application of frequencies by means of the generator 28, or the radiofrequency feed 32, it is possible to have an effect on different compositions of the thermoplastics.

In a concrete example, an ABS granulate having a particle size of less than 3 mm is introduced into the rotary drum 24. As process parameters, a process pressure of 0.7 mbar with a speed of rotation of the rotary drum 24 equal to 7 revolutions per minute is set. The power of the generator 28 is 1200 W, and that of the radiofrequency feed 32 is 600 W. Argon, oxygen and nitrogen are supplied as process gases, and the starting substance which has been introduced is plasma-treated for a duration of 300 s overall. In detail, a treatment is carried out with an argon plasma for 30 s under radiofrequency excitation, and 30 s under microwave excitation, with an oxygen plasma for 60 s under radiofrequency excitation and 60 s under microwave excitation, and with a nitrogen plasma for 60 s under radiofrequency excitation and 60 s under microwave excitation. The generator 28 in this case produces a frequency of 2.45 GHz and the radiofrequency feed 32 produces a frequency of 13.56 MHz.

After the plasma treatment granulate may the ABS granulate may, for example, be melted and applied to a glass plate that serves as a support. After the ABS granulate melt has solidified, it adheres firmly to the glass plate without a bonding agent. The layer of solids that contain alkyl groups which has been applied can then be processed directly without a further intermediate treatment, for example it can be printed on, adhesively bonded, coated, etc. Polar groups that contain oxygen and nitrogen and lead to a chemical modification of the starting material were incorporated in the ABS granulate by the treatment with the process gas plasmas (inert gas plasma, reaction gas plasma).

This structural change is, for example, manifested by a change in the surface properties. Using a water test, it is possible to demonstrate a considerably improved wettability of the thermoplastic that has been treated in accordance with the invention, in comparison with an untreated thermoplastic.

I claim:

1. Process for the chemical modification of thermoplastics that contain alkyl groups comprising subjecting a granulated thermoplastic that contains alkyl groups to a plasma treatment with varying frequencies in a frequency range of from 10 kHz to 10 GHz.

2. Process according to claim 1 wherein the plasma treatment is carried out with combinations of varying frequencies of different value.

3. Process according to claims 1 or 2 wherein the plasma treatment is carried out while supplying at least one inert gas.

4. Process according to claims 1 or 2 wherein the plasma treatment is carried out while supplying at least one reaction gas.

5. Process according to claims 1 or 2 wherein the plasma treatment is supplied sequentially with at least one inert gas plasma, at least one reaction gas plasma or a reaction gas mixture plasma, or while supplying a mixture of at least one inert gas and at least one reaction gas.

6. Process according to claims 1 or 2 wherein the plasma treatment is an alternating plasma treatment carried out in the presence of at least one inert gas plasma, at least one reaction gas plasma or at least one mixture of an inert gas/reaction gas plasma.

7. Process according to claims 1 or 2 further comprising carrying out compounding before, after, or before and after the plasma treatment.

8. Process according to claims 1 or 2 wherein the plasma treatment takes place at a process pressure of from 0.1 mbar to 2 mbar.

9. Process according to claims 1 or 2 wherein the duration of the plasma treatment is between 5 seconds and 900 seconds.

10. Process according to claims 1 or 2 wherein the granulated thermoplastic that contains alkyl groups is mixed/stirred during the plasma treatment.

* * * * *